United States Patent

[11] 3,625,609

[72] Inventor Roy A. Clapp
 Coon Rapids, Minn.
[21] Appl. No. 865,860
[22] Filed Oct. 13, 1969
[45] Patented Dec. 7, 1971
[73] Assignee Nord Photo Engineering, Inc.
 Minneapolis, Minn.

[54] COMBINED FOCUSING AND PROBE DEVICE FOR PHOTOGRAPHIC ENLARGERS
 13 Claims, 4 Drawing Figs.
[52] U.S. Cl. .................................................... 355/60,
 355/68, 250/227
[51] Int. Cl. ........................................................ G03b 27/74
[50] Field of Search ............................................ 355/60, 68;
 250/227

[56] References Cited
UNITED STATES PATENTS
2,651,969 9/1953 Thor............................ 355/68 X
3,114,283 12/1963 Gruner........................ 250/227 X Primary Examiner—Samuel S. Matthews
Assistant Examiner—E. M. Bero
Attorney—Dugger, Peterson, Johnson and Westman ABSTRACT: A mirror is pivotable about an axis spaced a given distance from the plane in which the photosensitive paper is normally placed. The viewing screen of a focusing magnifier is placed an equivalent distance from the axis and also the light measuring probe aperture is likewise spaced an equivalent distance from said axis. In this way, any discrepancies attributable to the so-called inverse square law are automatically eliminated.

PATENTED DEC 7 1971

INVENTOR.
ROY A. CLAPP

BY
Dugger, Peterson, Johnson & Westman

ATTORNEYS

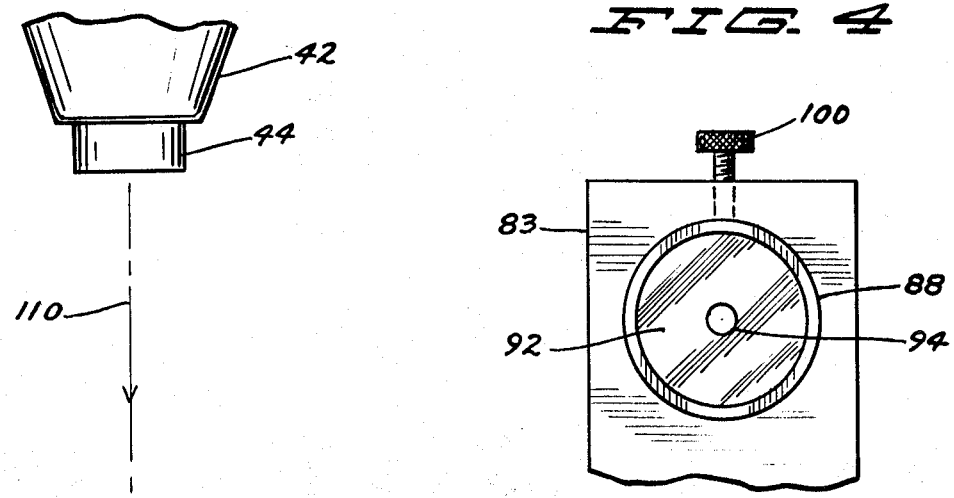
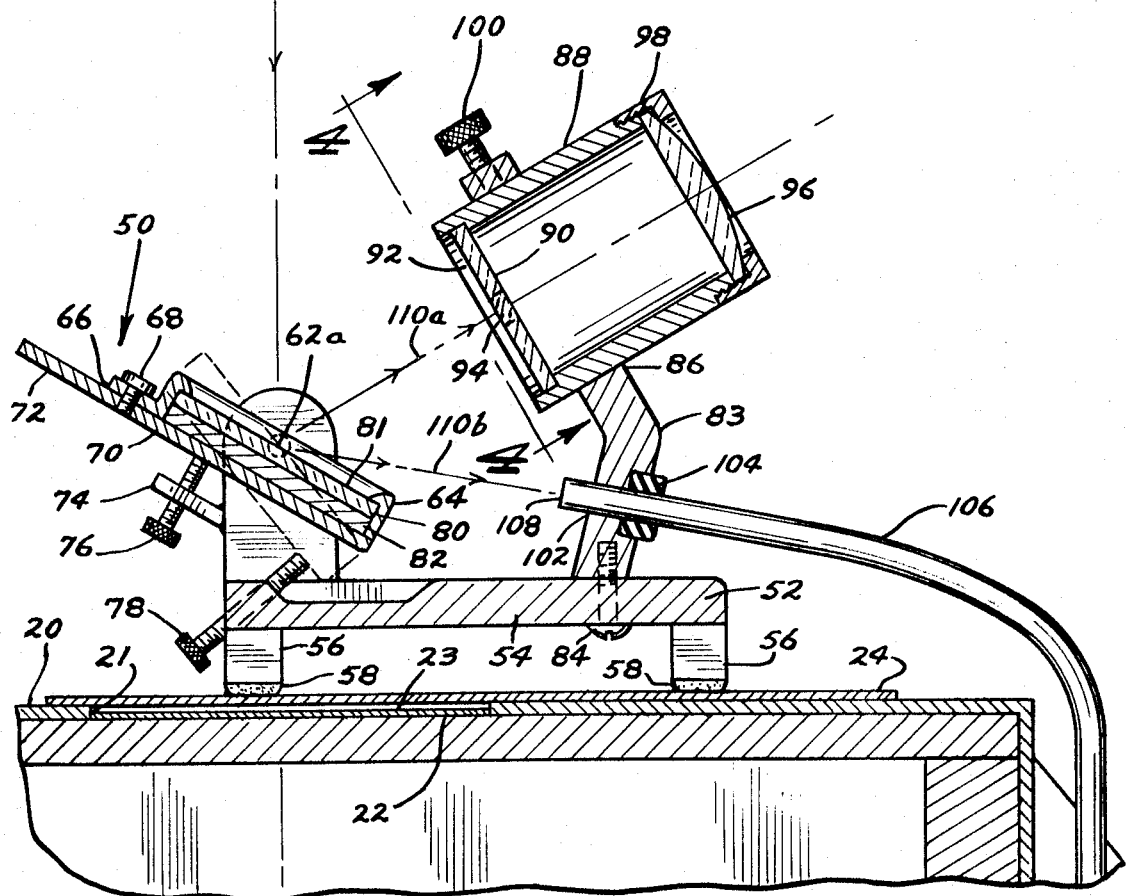

COMBINED FOCUSING AND PROBE DEVICE FOR PHOTOGRAPHIC ENLARGERS

BACKGROUND OF THE INVENTION

1. Field of the Invention

The present invention relates to photographic enlargers, and pertains more particularly to a device that will permit both the proper focusing and the proper determination of the light conditions.

2. Description of the Prior Art

In enlarging, to establish the proper exposing conditions in terms of light intensity, duration of exposure, and the color balancing of the printing light, thereby enabling the photographer to determined completely the printing conditions that will yield a satisfactory print, photoelectric meters or analyzers have been provided which employ a probe that is placed on the paper easel of the enlarger. The probe has a small aperture for receiving the projected light and thus permitting measurements to be taken of the intensity of the light existing at the plane of the photosensitive paper. Since the probe has a small aperture, it is possible to move the probe into any predetermined target area. A common target is a highlight flesh tone. The light intensity transmitted by an unknown negative can be compared with that of a known reference negative and thus the required printing conditions established.

There have been several disadvantages with respect to prior art probe equipment. The most common of these disadvantages is the fact that the probe must have a substantial vertical dimension so the aperture at the top of the probe is closer to the lens of the enlarger than the paper which is to receive the photographic exposure. Hence, the probe receives a higher light intensity than the paper and an allowance has to be made for this. The allowance or compensation can be made so long as the enlarger is set at a particular magnification such that he lens is at a fixed distance from the paper and at a different but also fixed difference from the probe aperture. However, when this magnification is changed, the enlarger lens s moved either closer or farther from the paper plane, the probe aperture being no longer at a location having the same percentage of the original distance.

For example, it can be assumed that a particular piece of equipment is being utilized for making a specific size print and that the lens is, say 16 inches from the paper. If the vertical dimension of the probe is 2 inches, the aperture of the probe will receive 30.5 percent more light than the paper because of the square of the distance law of illumination. If the lens is moved to make a different size print so it is now 8 inches from the paper, the probe is 6 inches from the lens while the paper is 8 inches away. Under these conditions, the probe would receive 78 percent more light than the paper. Thus, a correction must be calculated for every change in magnification. Consequently, even through prior equipment manufacturers have gone to considerable lengths to reduce the height of their probes, any reduction in this dimension simply reduces the degree of error without eliminating it entirely.

On attempt to overcome the foregoing difficulty has been to intercept the light from the lens with a mirror placed at an angle and then place the actual probe aperture so that the folded path of light has the same length as the light would have with respect to the full distance in relation to the paper. For example by placing a mirror at 45° so the center of the mirror is 1 inch, say, from the paper, then by moving the prove aperture to 1 inch from the center of the mirror, the length of the light path is made identical. While this solves the problem just described, nonetheless a new problem is introduced. Inasmuch as the light level provided by an enlarger can be quite low, especially with a dense negative, it is extremely difficult to determine the exact area that the probe is reading. Even using a probe not employing a mirror the top of the probe (with the exception of the aperture) painted white, there is considerable difficulty in seeing the image clearly enough to select the desired target area. However, when the mirror is interposed, it becomes considerably more difficult to determine the area being read. it is necessary to view the end of the probe, and of course the mirror interferes with the most advantageous viewing angle, the result being that it can only be seen obliquely. Furthermore, due to the end of the probe being quite small, only a very small section of the negative is visible at one time, and consequently it is difficult to recognize the selected area because only a small portion of the total negative area is visible.

Accordingly, it will be appreciated that all of the present probes are quite difficult to position accurately and to obtain a reading of a particular desired target area. Consequently, the end result is that an erroneous reading is made and a faulty print is subsequently produced which must be remade.

Another important practical difficulty that should be taken into account, and this is in order to take a reading at all, is that it is usual practice to open up the lens diaphragm to its widest opening for the purpose of locating the probe and then reducing the opening of the diaphragm before the actual print is made. Frequently, the photographer will forget to reset the lens diaphragm, and here again a faulty print results.

Still further, in addition to taking a light reading which has involved the difficulties dealt with above, most photographers wish to adjust the focus very critically to get the sharpest possible print. In order to achieve this, a focusing magnifier is utilized. The simplest device is a magnifying glass, but since the photographer cannot view the print vertically because his head would obstruct the light, there would be no image available for viewing. Therefore, it has been necessary to view the image on the easel at an extremely oblique angle and this has proved to be quite unsatisfactory. Focusing magnifiers have been available which overcome this difficulty by having a mirror intercept the vertical light from the lens and reflect it onto a ground glass viewing screen which has a magnifying lens associated with the opposite side of the screen. In this way, the operator can look through the magnifying lens at the translucent viewing screen and see the image projected thereon. By arranging the distances between the mirror and the paper plane, and the mirror and the viewing screen, the image is in correct focus when viewed on the screen. In order to make a print from a negative, the photographer must insert the focusing magnifier and critically focus the image. thereafter, the focusing magnifier must be removed and a probe Thereafter, in its stead so that the proper exposure conditions can be determined. This, quite obviously, is both troublesome and time consuming.

SUMMARY OF THE INVENTION

Accordingly, one object of the present invention is to provide a single device or instrument that performs the duties heretofore performed by two separate items of equipment.

Another object is to obviate the need of first placing the focusing magnifier in position and then replacing this piece of equipment with the probe.

A further object is to enable the operator to take a probe reading at the particular lens stop which is used for the exposure, thereby avoiding the need for first opening the diaphragm and then reclosing same, and thus eliminating the risk that the operator will forget to stop down the diaphragm after the reading has been taken.

Another important object of the invention is concerned with the high degree of accuracy with which the target can be selected so that it does not include unwanted areas that would otherwise introduce errors in the meter readings. For instance quite commonly the forehead is selected for making the probe or meter readings. If the head size is quite small, it is virtually impossible to place the older types of probes on exactly the right area without the danger of a slight error creeping into the placement, particularly with respect to some of the hair area which gives a completely erroneous reading and consequently results in a faulty print.

Yet another object is to minimize the mental strain to which an operator is subjected. Whereas a skilled operator can use present-day probes with a fairly high percentage of successful results, he nonetheless is constantly confronted with the possible uncertainty as to whether the probe has been placed exactly and the question as to whether he has placed it accurately contributes to the mental strain that is avoided when practicing the instant invention. Furthermore, the uncertainty creates problems with respect to the specific cause as far as an improper print is concerned. The operator is never quite certain that the poor quality was due to improper probe placement or because of some peculiarity of the negative itself. He is therefore faced with trying to guess which of two courses should be followed.

Quite briefly, the invention herein described involves the focusing of the lens of the enlarger when the mirror has been swung into one position so as to cause the image to appear on the viewing screen. When the focusing operation has been completed, the operator simply swings the mirror into the reading position which causes the visible image to disappear and the light that has been impinging on the viewing screen is transferred to he probe aperture. The operator then makes his reading in the usual way. When this phase of the operation has been completed, he removes the entire device and then follows the normal procedure for making the actual photographic enlargement.

BRIEF DESCRIPTION OF THE DRAWINGS

FIG. 3 is a view taken in the direction of line 3—3 of FIG. 1, the scale being considerably larger so as to illustrate the constructional makeup of my device, and FIG. 4 is a view taken in the direction of line 4—4 of FIG. 3 for the purpose of depicting the circular reticle provided on the viewing screen. DESCRIPTION OF THE PREFERRED EMBODIMENT Referring to FIG. 1, a typical photographic enlarger has been designated generally by the reference numeral 10. The photographic enlarge 10 include a table 12 having a roll easel 14 thereon which has at one side a paper supply portion 16 and at the other side a takeup reel portion 18 for the photosensitive paper after it has been successively exposed, the easel 14 further including a rectangular frame portion 20 extending between the respective portions for the paper supply 16 and takeup reel 18 which frame is formed with a rectangular opening 21 (FIG. 3) so as to expose the printing paper 22 positioned therebeneath, the paper 22 having an upper photosensitive surface designated by the reference numeral 23 therebeneath. However, steel coverplate 24 covers the opening 21 and the paper 22 until the actual exposure is made.

Figure 1:
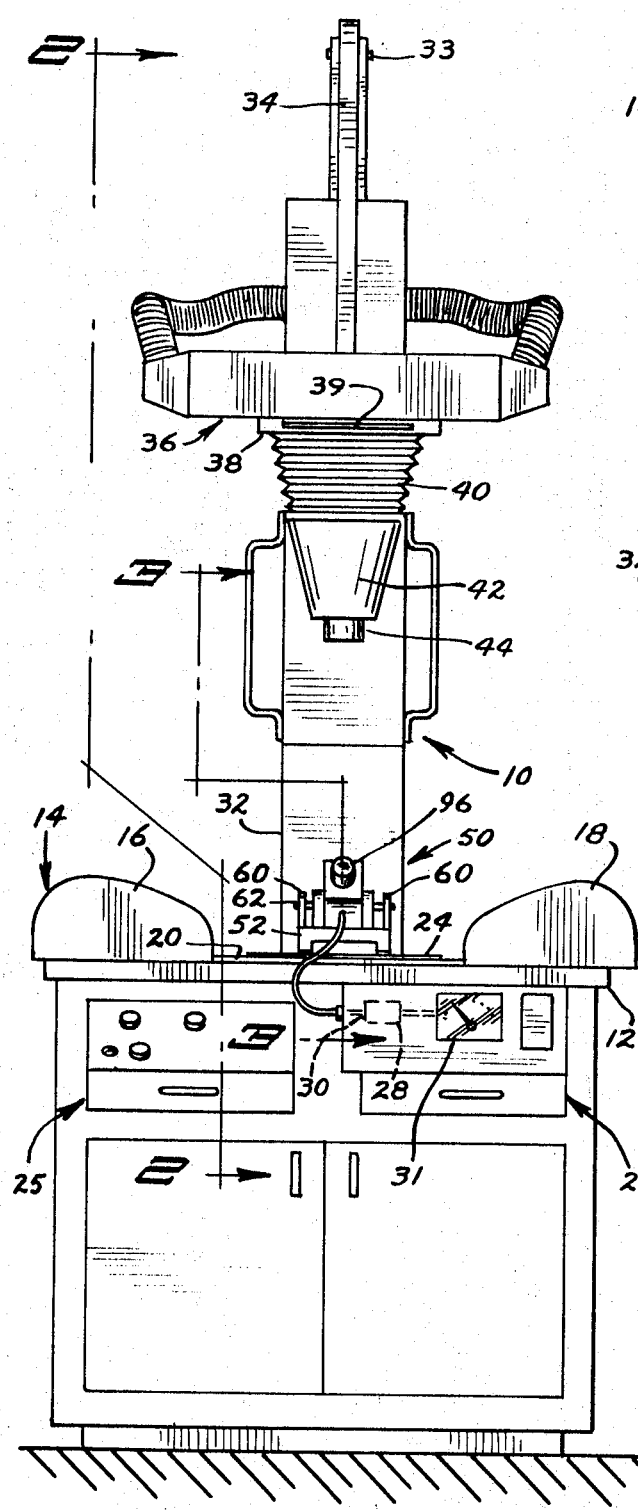
FIG. 1 is a front elevational view of a typical photographic enlarger with my device placed thereon.

The enlarger 10 further includes two sets of controls 25 and 26 which need not be described in any great detail. However, it should be appreciated that the controls labeled 26 contain a photoelectric sensor 28 having an opening at 30. All that need be understood with respect to the photoelectric sensor 28 is that it senses the amount of light impinging thereon, the light entering through the opening 30, and after amplification of the resulting electrical signal an indication of the light intensity is provided by a meter 31 which is part of the controls 26.

Further describing the photographic enlarger 10, a column 32 extends upwardly and rotatably supports a sheave at 33 about which is entrained a flexible strap 34. At one end of the flexible strap 34 is a lamphouse assembly 36, a suitable counterweight (not shown) balancing the said lamphouse.

Although the lamphouse 36, as well as other portions of the enlarger 10, can be of conventional construction, it should be discerned that there is a negative holder 38 in the lower portion thereof having a slot 39 via which the production negative to be printed can be inserted so that the light passing downwardly from the lamphouse assembly 36 will be directed through the negative onto the photosensitive paper 22. Beneath the negative holder 38 is a bellows 40 connected to a lens casing 42 having a lens 44 at its lower end. A rack 46 (FIG. 2) is affixed to the lamphouse assembly 36, the rack 46 depending downwardly. A bracket 48, which is fixedly connected to the lens casing 42, is slidably guided by the column 32 which can be moved upwardly and downwardly through the agency of a focusing knob 49 having a gear (not visible) affixed thereto, the teeth of which are engaged with the rack 46. It really need only be understood that the lens 44 is movable vertically so as to focus the light rays that pass downwardly through the negative that is placed in the holder 38; various arrangement have been used and the rather schematically described means is only presented for the sake of completeness.

The invention is concerned with a device that has been denoted in its entirety by the reference numeral 50. From FIG. 3 it will be discerned that the device 50 comprises a support 52, preferably of cast iron, having a bedplate 54 with legs 56 thereon. Beneath each leg 56 is a small waferlike magnet 58 that assists in anchoring the support 52 on the coverplate 24 during the use of the device 50.

A pair of spaced trunnion journals 60 are apertured so as to receive therein in gudgeonlike manner a pair of oppositely directed pins 62 integral with a bezel 64. Although the bezel 64 may assume a variety of designs, it will be assumed that a sufficient number of ears 66 (one appearing in FIG. 3) are provided thereon so that screws 68 extending through apertures in such ears 66 can be attached to a plate 70 formed with a handle or extension 72. On one of the trunnion journals 60 is a lug 74 having an aperture which is tapped so as to accommodate a top or adjustment screw 76 for a purpose presently to be explained. A second stop or adjustment screw 78 is threadedly mounted in similar fashion, being carried through a portion of the support 52 or an extension thereof.

The bezel 64 supports a mirror 80 of the front-surface type so that its reflecting surface resides in an angularly adjustable plane. A backup disk or plate 82 of suitable thickness may be used to position accurately the surface 81 so that it contains the axis 62a about which the pins 62 pivot. It will soon be appreciated that this is an important aspect of the invention.

The device 50 further includes an angled bracket 83, preferably of aluminum or some nonmagnetic materials, the bracket 83 being fastened in a fixed relationship with the bedplate 54 by means of one or more screws 84. The bracket 83 is formed with an opening at 86 which is of a size so as to receive therein a metal tube 88. Cemented, or otherwise secured in one end of the metal tube 88, is a ground glass viewing screen 90 having a surface at 92 provided with a reticle 94 in the form of a circular hairline or opaque mark. At the end of the tube 88 opposite the ground glass viewing screen or plate 90 is a magnifying lens 96 which is held in place by a threaded retaining collar 98. Suggestively, a set screw 100 threadedly carried by the bracket 83 can be used to anchor the metal tube 88 in a preferred longitudinal relationship as will be presently described.

A second hole or counterbored opening 102 having an elastomeric sleeve 104 disposed therein accommodates a fiber optics cable 106 having a light-receiving face or surface 108 serving as the probe aperture. The cable 106 directs light to the previously mentioned sensor 28 through its opening 30. The sleeve 104 retains the aperture 108 at the proper location. It will be appreciated that the sensor 28 and the fiber optics cable 106 comprise a probe in the illustrated instance. However, the invention is susceptible to using older type probes in which the sensor 28 itself is placed on the table 12, the light then entering directly into the opening 30 without first passing through any able 106. By employing the light conductive cable 106, though, relatively long wires are eliminated which have acted adversely as an antenna picking up unwanted radiation and producing objectional noise which has disturbed the light signal. In such older type probes, the opening 30 would be the aperture, whereas with the fiber optics type the surface or face 108 constitutes the probe aperture. In either event, the attendant problems are obviated when utilizing the instant invention.

Being of the front-surface type, the mirror 80 is such that is upper surface 82 can be located in a plane containing the axis 62a of rotation of the bezel 64 provided by the pins 62. In other words, the pins 62 have their centers located so as to provide the axis 62a The location of the axis 62a about which the bezel 64 pivots, and also the mirror 80 by reason of its being mounted in said bezel, is extremely important to a practicing of the invention. More specifically, the axis 62a is spaced above the surface 23 of the photosensitive paper 22 is a given distance. An equivalent distance or spacing is provided between the axis 62a and the surface 92 of the ground glass viewing screen 90 which has the reticle 94 thereon. Still further, an equivalent spacing is provided between the axis 62a and the surface or aperture labeled 108 of the light conductive fiber optics cable 106. Hence, there are three equal distances carefully provided in order to derive the benefits from the present invention.

Figure 2:
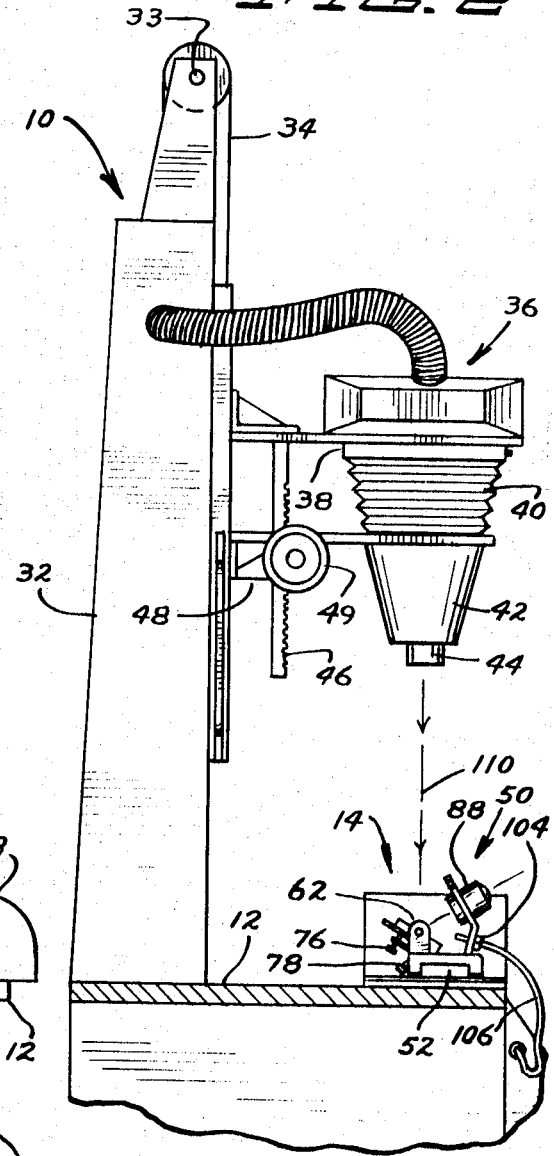
FIG. 2 is a view of the upper portion of the apparatus exemplified in FIG. 1, the view being in the direction of line 2—2.

To assist in fully appreciating the necessity for having the above-alluded to equal spacings, a sequence of vertically directed arrows 110 has been superimposed on FIG. 3, the arrows also appearing in FIG. 2. These arrows 11 intersect the axis 62a of rotation provided by the pivot pins 62. Hence, the ray of light represented by the arrows 110 impinges upon the surface of the mirror 80 at the axis of rotation. When the mirror 80 is in its depicted angular position (shown in solid outline) that is assumes when the plate 70 is against the first adjustment screw 76, then the ray represented by the numeral 110a is reflected onto the translucent viewing screen 90. On the other hand, when the handle 72 is manipulated so as to swing the plate 70 into ta position (shown in phantom outline) against the other adjustment screw 78, then the ray 110 will be reflected via a path labeled 110b, impinging upon the surface 108 of the cable 106, and then traveling along the fibers, which comprise this cable, to the sensor 28.

In initially preparing the device 50 for use, it will be appreciated that it is properly placed on the cover plate 24. Being of steel, the plate 24 releasably retains the device 50 in any selected position on the cover plate 24 by the magnetic attraction developed through the medium of the various magnets 58 beneath the lower ends of the legs 56 of the cast iron support 52. The strength of the magnets 58 is such that they will permit shifting of the device 50 into virtually any number of possible positions. The various horizontal positions, or locations however, do not destroy the spacing of the axis 62a of rotation of the mirror 80 with respect to the plane containing the photosensitive paper 22.

With the device 50 in place on the ease cover plate 24, and the focus light of the enlarger 10 turned on, the mirror 80 is pivoted so that it assumes the angular relationship pictured in FIG. 3, this being the position in which the ray 110 provided by the focus light is reflected onto the viewing screen 90, more specifically its surface 92. The adjustment screw 76 is advanced or retracted so that the reflected ray 110a strikes the circular reticle 94 on the surface 92 of the viewing screen 90. A convenient way of doing this is to place a metal plate having a small hole drilled therein the negative holder 38, the plate being inserted through the slot 39 in the same manner as the negative would be inserted. By adjusting the magnification of the enlarger 10, until the hole in the inserted plate is of the correct size to exactly fit within the reticle 94, this being done with the mirror in the pictured position, then when the mirror 80 is swung to its alternate position, the adjustment screw 78 can be positioned so that the spot of light passing through the hole in the inserted metal plate is exactly centered on the face or surface 108 of light conductive cable 106. The setting of the adjustment screws 76 and 78, it will be understood, need be made only once.

After the preliminary procedure outlined above has been completed, then the enlarger 10 is in readiness for making a print. It is then that the actual negative is substituted for the previously referred to metal plate. With focus light of the enlarger 10 on, the magnified image derived therefrom is viewed on the screen 90 through the lens 96 and the necessary adjustments are made with the enlarger lens 44 by way of the knob 49 to provide a sharply focused image. The device 50 can be laterally or horizontally shifted so that virtually any preselected area of the negative can be used as the target area, the image appearing exactly within the circular reticle 94. Because of the magnified image, this target area can be positioned with high precision to eliminate any extraneous areas. With this accomplished, the mirror 80 is swung into its alternate position, that is so that the plate 70 rests on the stop or adjustment screw 78, the alternate position then causing the identical image to be shifted from the viewing screen 90 onto the surface 108 of the light conductive cable 106, which surface 108, as already explained herein, constitutes the probe aperture. The light transmitted through the cable 106 is directed to the opening 30 of the photoelectric sensor 28 at the other end of the fable 106. The light intensity thus reaching the sensor 28 is determined by the meter 31 in conventional manner so that the proper duration of exposure can be determined.

It should be apparent from the foregoing that may invention can be employed wit any enlarger. Obviously, the design of the easel 14 will vary from manufacture to manufacturer, and hence the thickness of the frame portion 20 will differ. Likewise, the thickness of the cover plate 24 will vary. However, any such variations only influence the height of the axis 62a with respect to the paper surface 23. Once this distance is determined, the surfaces 92 and 106 can be shifted so that the spacing between 62a and 92 equals he given spacing between 62a and 23, and the spacing between 62a and 106 equals said given spacing between 62a and 23.

I claim:

1. A combined focusing and probe device for photographic enlargers comprising a support adapted to be positioned between the lens of an enlarger and the plane normally containing the photosensitive paper, a mirror mounted for pivotal movement about an axis parallel to said plane and spaced a given distance therefrom, viewing means having a surface for receiving reflected light from said enlarger lens when said mirror is in one pivotal position, and light measuring means having a surface for receiving said reflected light when said mirror is in a second pivotal position, said surfaces both being spaced from said axis at distances equaling said given distance.

2. The device set forth in claim 1 in which said viewing means includes a tubular housing having a ground glass plate adjacent one end providing said first-mentioned surface and a magnifying lens adjacent the other end for magnifying the ray image appearing on said glass plate.

3. The device set forth in claim 2 in which said ground glass plate has a circular reticle centrally located thereon for enabling the selective viewing of a portion a negative positioned with respect to said enlarger lens.

4. The device set forth in claim 23 in which said light measuring means includes a light conductive cable having one end thereof providing said second-mentioned surface for transmitting light and a photoelectric sensor disposed at the other end of said cable, said light conductive cable and sensor comprising a probe and said second-mentioned surface a probe aperture.

5. The device set forth in claim 4 in which the photographic enlarger includes an easel of magnetizable metal defining the plane normally containing said paper, said support means including a plurality of magnets for engaging said easel to releasably retain said support means on said easel.

6. A combined focusing and probe device for photographic enlargers comprising reflection means, mean supporting said reflection means for pivotal movement about an axis spaced from the plane in which the photosensitive material normally is placed, means providing a first locus at which an image may be viewed, and means providing a second locus at which the light intensity of said image can be determined, said loci being spaced from said axis a distance equal to the distance said axis is spaced from said plane, whereby when said reflective means is in one pivotal position light from the enlarger is reflected via a first path to said first locus and when said reflective mean is in second pivotal position light from said enlarger is reflected via a second path to said second locus.

7. The device set forth in claim 6 including an adjustment screw for determining said one pivotal position of said reflective means and a second adjustment screw for determining said second pivotal position thereof.

8. The device set forth in claim 7 in which said loci are individually adjustable with respect to sad axis, and respective means for maintaining each locus in its adjusted position.

9. A method of focusing and determining the proper amount of light in preparation for making a photographic enlargement from a negative comprising the steps of reflecting light passing through only a portion of the negative from a location spaced a given distance from the plane in which the photosensitive paper is later placed onto a viewing surface spaced the same distance from said location as said location is spaced from said plane, focusing the enlarger while viewing said surface, and then reflecting the same light passing through said portion onto light measuring means having a surface spaced the same distance from said location as said location is spaced from said plane.

10. The method set forth in claim 9 including the additional step of shifting said location into various positions while spaced said given distance from the plane in which the photosensitive paper is later placed so that light is reflected from different portions of the negative until light from a preferred portion is reflected onto said viewing surface.

11. The method set forth in claim 10 in which the light is reflected by a reflective surface that is shiftable about an axis which constitutes said location so that light is reflected onto said viewing surface when said reflective surface is in one angular position and onto said surface of said light measuring means when in a second position.

12. The method set forth in claim 11 in which said reflective surface is provided by a mirror 13. The method set forth in claim 12 including the step of removing the mirror after said viewing and light measuring steps have been completed so as to avoid any light obstruction when the photosensitive paper is placed in said plane.

* * * * *

PO-1050
(5/69)

UNITED STATES PATENT OFFICE
CERTIFICATE OF CORRECTION

Patent No. 3,625,609          Dated December 7, 1971

Inventor(s) Roy A. Clapp

It is certified that error appears in the above-identified patent and that said Letters Patent are hereby corrected as shown below:

Column 1, line 17, "determined" should be --determine--; line 39, "he" should be --the--; line 41, "s" should be --is--; line 61, "On" should be --One--; line 67, "prove", should be --probe--; line 73, after "Even" insert --when--. Column 2, line 45, "thereafter" should be --Thereafter--; line 46, delete "Thereafter," and insert --inserted--. Column 3, line 22, "he" should be --the--; line 43, "enlarge" should be --enlarger--; same line, "include" should be --includes--. Column 4, line 14, "arrangement" should be --arrangements--; line 34, "top" should be --stop--; line 71, "able" should be --cable--. Column 5, line 5, "is" (second occurrence) should be --its--; line 9, after "62a" (first occurrence) insert --.--; line 13, after "22" delete "is"; line 25, "11" should be --110--. Column 6, line 21, "fable" should be --cable--; line 25, "may" should be --my--; line 26, "wit" should be --with--; line 33, "he" should be --the--; line 58, "23" should be --3--; line 71, "mean" should be --means--. Column 7, line 5, "mean" should be --means--.

Signed and sealed this 25th day of July 1972.

(SEAL)
Attest:

EDWARD M. FLETCHER, JR.          ROBERT GOTTSCHALK
Attesting Officer          Commissioner of Patents